Figure 1:
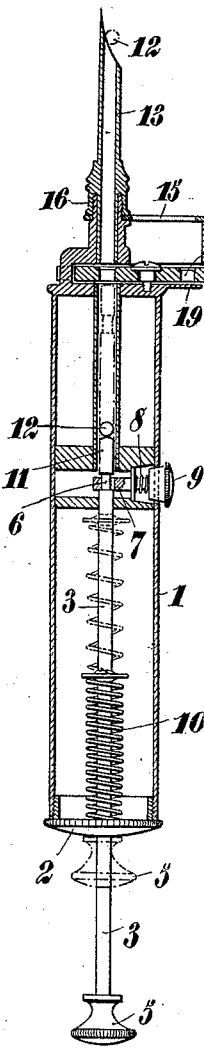

No. 842,631. PATENTED JAN. 29, 1907.
H. DEPERDUSSIN.
APPARATUS FOR INJECTING SOLID VACCINE MATTER.
APPLICATION FILED JAN. 25, 1906.

Witnesses
J. M. Ward Jr.
Lee B. Kemen

Inventor
Hippolyte Deperdussin
By Geo. T. Whittlesey
Atty.

UNITED STATES PATENT OFFICE.

HIPPOLYTE DEPERDUSSIN, OF PARIS, FRANCE, ASSIGNOR TO THE PASTEUR VACCINE COMPANY LIMITED, OF LONDON, ENGLAND, A FIRM.

APPARATUS FOR INJECTING SOLID VACCINE MATTER.

No. 842,631.     Specification of Letters Patent.     Patented Jan. 29, 1907.

Application filed January 25, 1906. Serial No. 297,803.

*To all whom it may concern:*

Be it known that I, HIPPOLYTE DEPERDUSSIN, a citizen of the French Republic, residing at Paris, in the Department of the Seine, France, have invented certain new and useful Improvements in Apparatus for Injecting Solid Vaccine Matter, of which the following is a specification.

This invention relates to an apparatus for injecting under the skin of animals a vaccine matter in the solid form—pills, for example.

This invention is shown in the drawings accompanying the present specification, in which—

Figure 2:
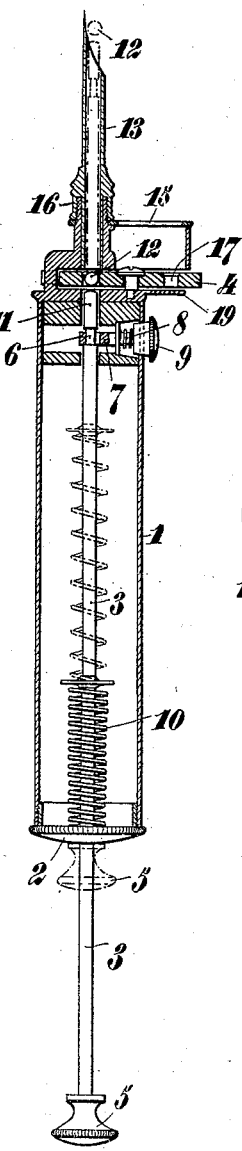
Figure 3:
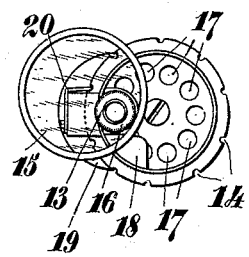

Figure 1 is a vertical cross-section. Fig. 2 is a cross-section of a modification of same apparatus. Fig. 3 is a plan view of the feeder.

This apparatus consists of two parts: first, the device by means of which the vaccine matter in the solid form (pills, for example) is driven in under the skin of animals; second, the feeder containing the vaccine matter in the solid form.

The present specification will refer to vaccine matter used in the form of pills, but it is evident that the present injecting apparatus, which forms the subject of this invention, may utilize any other appropriate form of solidified vaccine matter.

The device allowing the operator to drive in or throw the vaccine matter under the skin of animals may be of any appropriate type, and the one hereinafter described is only given as an example. This device consists of a metallic tube 1, closed at one end by a stopper 2, which is provided in its center with a hole, so as to permit the stem or rod 3 to pass through. At the other end is situated the feeder 4, which is so disposed as to present at a proper place and in front of the extremity of the stem 3 the pill to be ejected.

In the tube 1 works the stem 3, whose action is to throw or eject the pill out of the apparatus.

The device is set for action by pulling back the knob 5 till the groove 6 of the said stem comes into contact with any kind of catch 7, fitted with a small spring 8 and a push-button 9. This catching device also acts as a guide for the stem 3. A main spring 10 gives its propulsive power to the stem 3 and is compressed by pulling back the knob 5.

Once the device is set, it can be discharged by pressing the push-button 9, whereby the catch 7 is disengaged from the groove of the stem 3, which being violently propelled through the strained spring 10 its extremity 11, butting against the pill 12, which is presented by the feeder at the opening left for the purpose in the axis of the tube, forcibly ejects said pill through the hollow needle 13, situated at the extremity of the injecting apparatus.

The feeder is a flat notched barrel or disk 4, provided with a cover 15, either of transparent material or otherwise, which is free to move round an axis 16. The barrel is provided with a plurality of holes 17, in each of which a single pill can be received. A small plate 18, situated near the opening communicating with the hollow needle 13, is secured to the wall of the feeder and extends or covers a few holes (three, for example) of the barrel, so that the holes of this latter, each filled with one pill, pass successively before the opening carrying one pill at a time into line with the stem 3. This plate 18, which is secured in place, prevents two or more pills coming at the same time and obstructing this said opening, which is made for one pill alone to pass.

By revolving the barrel a certain number of notches each hole filled with one pill will pass successively before the opening situated in the axis of the hollow needle 13.

The operation is as follows: The feeder 4 is uncovered by turning the disk 15 around its axis 16. It is not necessary to take the pills one by one nor to touch them, simply pour them in until the feeder is full. A few pills immediately fill up the holes 17 of the barrel, the bottom of which is formed by a plate 19, preferably integral with the tube 1, and consequently not revolving with the barrel. Once the pills are poured into the barrel the disk 15 is replaced over the feeder 4 and is kept in that position by screwing down tightly the hollow needle 13 or by fixing it by any other convenient means. The feeder being ready the stem is drawn back until engaged by the catch 9 in the same way as has been described hereinbefore. When the barrel (which alone is made to revolve) is turned by a few notches from right to left, a small spring 20, fixed upon the tube 1, presses against the notches on the side of the said barrel, thus preventing it from turning back and allowing it to be placed in such predetermined position that the holes will exactly come into line with the axis of the hollow needle. Before the first inoculation it is necessary to turn the barrel three notches, this, of course, if the plate 18 covers three holes. The first pill is then in the axis of the needle—that is to say, ready to be injected—as it is shown in Fig. 1. The point of the needle being sterilized, it is introduced through the skin of the animal at the desired spot and the push-button is pressed. The stem 3 is disengaged all at once, the spring expanding causes the extremity 11 of the stem to butt against the pill, which is propelled out of the apparatus, passing through the hollow needle 13 under the skin of the animal. The stem 3 afterward occupies the position shown in dotted lines. For the second inoculation the stem 3 is again drawn back, the barrel is turned one notch, bringing the second pill before the opening of the needle, this latter being again sterilized and introduced under the skin of another animal, the push-button is pressed, and the second inoculation is effected, so on for the following operations. Such an apparatus of usual type may contain about a hundred pills in the feeder. The advantages in using this apparatus will be clearly understood if consideration be given to the conditions of inoculation practice and the rapidity with which these operations may be accomplished.

The extremity 11 of the stem 3 may come either at the opening of the barrel containing the pills to be ejected, as shown in Fig. 1, or pursuing its course pass inside the hollow needle to occupy the position shown in dotted lines in the Fig. 2, which is a modification of the same apparatus.

It is evident that the device for throwing the pill out of the apparatus might be quite different from the one given herein as example without changing a single particle of the principle of the present invention, which consists in placing a great number of pills in a feeder and introducing these under the skin of animals in combination with the throwing or ejecting device of any appropriate type. As another example, the disposition herein described may be exchanged for a device similar to that employed in the firearms called "revolver."

Having now particularly and fully described and ascertained the nature of my said invention and in what manner the same is to be performed, I declare that what I claim is—

1. A device for inoculating animals with solid vaccine matter, comprising a handle, a hollow needle, a stem working in the handle and needle, a spring adapted to be compressed when the stem is drawn back, a catch for engaging with the stem when retracted, and means for feeding the vaccine into line with said stem.

2. A device for inoculating animals with solid vaccine matter, comprising a handle, a hollow needle thereon, a stem working in the handle and needle and having a notch, a spring adapted to be compressed when the stem is drawn back, a spring-catch to engage with said stem when retracted, and means for feeding the vaccine into line with said stem.

3. In a device for inoculating animals with solid vaccine matter, the combination with a hollow needle, of means for ejecting the vaccine matter therethrough, and a feeder for said matter comprising a rotatable element having holes for the vaccine matter and so mounted as, when rotated, to bring said holes in line with said needle.

4. In a device for inoculating animals with solid vaccine matter, the combination with a hollow needle, of means for ejecting the vaccine matter therethrough, and a feeder for said matter comprising a rotatable element having holes for the vaccine matter and so mounted as, when rotated, to bring said holes in line with said needle, and a cover mounted eccentrically to the axis of rotation of said element.

5. In a device for inoculating animals with solid vaccine matter, the combination with a handle, of a hollow needle mounted thereon a spring-actuated stem in said handle for ejecting the vaccine matter through said needle, a disk mounted to rotate on an axis eccentric to that of the needle and provided with a series of holes adapted to receive the vaccine matter and be brought in line with the needle as said disk is rotated, a detent engaging with said disk, and a transparent cover adapted to be moved over and away from said disk.

6. In a device for inoculating animals with solid vaccine matter, the combination with a handle, of a hollow needle mounted thereon, a spring-actuated stem in said handle for ejecting the vaccine matter through said needle, a disk mounted to rotate on an axis eccentric to that of the needle and provided with a series of holes adapted to receive the vaccine matter and be brought in line with the needle as said disk is rotated, a detent engaging with said disk, a transparent cover adapted to be moved over and away from said disk, and a stationary plate covering the holes adjacent to said needle.

In testimony whereof I have hereunto set my hand in presence of two subscribing witnesses.

HIPPOLYTE DEPERDUSSIN.

Witnesses:
  HENRY DANBERY,
  LUCIEN CRESPING.